(12) United States Patent
Shibata et al.

(10) Patent No.: US 9,164,322 B2
(45) Date of Patent: Oct. 20, 2015

(54) DISPLAY UNIT

(75) Inventors: Akihiro Shibata, Miyagi (JP);
Mitsunari Hoshi, Miyagi (JP)

(73) Assignee: Sony Corporation, Tokyo (JP)

( * ) Notice: Subject to any disclaimer, the term of this patent is extended or adjusted under 35 U.S.C. 154(b) by 76 days.

(21) Appl. No.: 14/235,376

(22) PCT Filed: Jul. 30, 2012

(86) PCT No.: PCT/JP2012/069299
§ 371 (c)(1),
(2), (4) Date: Jan. 27, 2014

(87) PCT Pub. No.: WO2013/018750
PCT Pub. Date: Feb. 7, 2013

(65) Prior Publication Data
US 2014/0192303 A1    Jul. 10, 2014

(30) Foreign Application Priority Data
Aug. 3, 2011    (JP) .................................. 2011-170008

(51) Int. Cl.
*G02F 1/1335*    (2006.01)
*G02F 1/13363*    (2006.01)
*G02B 27/26*    (2006.01)
*G02B 5/30*    (2006.01)

(52) U.S. Cl.
CPC .......... *G02F 1/13363* (2013.01); *G02B 5/3016* (2013.01); *G02B 27/26* (2013.01)

(58) Field of Classification Search
CPC ... G02B 27/26; G02B 5/3016; G02F 1/13363
USPC ....................................................... 349/119
See application file for complete search history.

(56) References Cited

U.S. PATENT DOCUMENTS

| 3,881,706 | A |  | 5/1975 | Mohrmann |
| 5,327,285 | A |  | 7/1994 | Faris |
| 5,676,975 | A |  | 10/1997 | Dezes et al. |
| 2005/0168816 | A1 | * | 8/2005 | Fukaishi et al. ............. 359/465 |
| 2009/0244412 | A1 | * | 10/2009 | Tsukagoshi ....................... 349/8 |
| 2010/0149472 | A1 | * | 6/2010 | Hoshi ........................... 349/119 |

FOREIGN PATENT DOCUMENTS

JP    2010-164956    7/2010

* cited by examiner

*Primary Examiner* — Sang V Nguyen
(74) *Attorney, Agent, or Firm* — K&L Gates LLP

(57) ABSTRACT

There is provided a display unit capable of reducing deterioration in the 3D characteristics. A phase difference device is bonded to a surface on a light outgoing side of a liquid crystal display panel. In the phase difference device, two kinds of phase difference regions with slow-axis directions different from each other are arranged in correspondence with each pixel. Each of the phase difference regions is arranged in contact with the phase difference region of a different kind, and a side section, of each of the phase difference region, that is in contact with the phase difference region of the different kind has waviness with an amplitude a that satisfies following expressions:

$$0 < a < a\max(\phi)$$

$$a\max(\phi) = -0.7/(\phi - 1.2) + 0.35$$

$$\phi = \arctan(P/(4d))$$

P: a pixel pitch
d: a distance between the pixel and the phase difference device.

3 Claims, 15 Drawing Sheets

(A)

(B)

(A)

(B)

DISPLAY UNIT

CROSS REFERENCES TO RELATED APPLICATIONS

The present application is a national stage of International Application No. PCT/JP2012/069299 filed on Jul. 30, 2012 and claims priority to Japanese Patent Application No. 20119-170008 filed on Aug. 3, 2011, the disclosure of which is incorporated herein by reference.

BACKGROUND

The present technology relates to a display unit that includes a phase difference device for varying a polarization state of light.

As a stereoscopic image display unit of a type using polarizing glasses, a display unit has been available that emits light in different polarization states between left-eye pixels and right-eye pixels. In such a display unit, a viewer puts on the polarizing glasses, and light outgoing from the left-eye pixels is allowed to enter only a left eye, while light outgoing from the right-eye pixels is allowed to enter only a right eye. Thus, observation of stereoscopic images is achieved.

For example, in PTL 1 and PTL 2, for the purpose of emitting light in different polarization states for between the left-eye pixels and the right-eye pixels, it has been proposed to provide a phase difference device where a liquid crystal cell is partially formed, or a phase difference device where a plurality of kinds of phase difference materials with different slow axes from one another are arranged. Further, for example, in PTL 3, it has been proposed to provide a phase difference device that is formed by applying and polymerizing liquid crystal on a patterned photo-alignment film.

CITATION LIST

Patent Literature

[PTL 1] Specification of U.S. Pat. No. 5,676,975
[PTL 2] Specification of U.S. Pat. No. 5,327,285
[PTL 3] Specification of U.S. Pat. No. 3,881,706

SUMMARY

Meanwhile, the above-described phase difference device is arranged on an image display surface of a stereoscopic image display unit. Therefore, in a case where a distance between the phase difference device and the image display surface is long, when a viewer watches the image display surface from an oblique direction, a positional displacement may occur between a liquid crystal cell in a display panel and the phase difference device, and the 3D characteristics (crosstalk) may be deteriorated.

Accordingly, it is desirable to provide a display unit capable of reducing deterioration in the crosstalk.

A display unit according to an embodiment of the present technology includes a display panel where a plurality of pixels are arranged in a matrix, and a phase difference device bonded to the display panel. In this display unit, the phase difference device includes a phase difference layer where two or more kinds of phase difference regions having different slow-axis directions are arranged in correspondence with the respective pixels. Each of the phase difference regions is arranged in contact with the phase difference region of a different kind, and a side section, of each of the phase difference regions, that is in contact with the phase difference region of the different kind has waviness with an amplitude a that satisfies following expressions.

$$0 < a < a\max(\phi)$$

$$a\max(\phi) = -0.7/(\phi - 1.2) + 0.35$$

$$\phi = \arctan(P/(4d))$$

P: a pitch of the pixel
d: a distance between the pixels and the phase difference device In the display unit according to an embodiment of the present technology, there is provided the waviness with the amplitude a satisfying the expression below at the side section that is in contact with other kind of phase difference region in each of the phase difference regions included in the phase difference device. This reduces a rate of incidence of right-eye image light into a left-eye phase difference region, or of incidence of left-eye image light into a right-eye phase difference region in reverse, that is caused by the waviness of the side section of each of the phase difference regions, as compared with the existing rates.

According to the display unit of an embodiment of the present technology, incidence of light caused by the waviness of the side section of each of the phase difference regions is allowed to be reduced, and therefore, it is possible to reduce deterioration in the crosstalk.

Additional features and advantages are described herein, and will be apparent from the following Detailed Description and the figures.

DETAILED DESCRIPTION

Hereinafter, some modes for carrying out the invention are described in detail with reference to the drawings. It is to be noted that the descriptions are provided in the order given below.
1. Embodiment
　1.1 Configuration of Display Unit
　1.2 Configuration of Polarizing Glasses
　1.3 Method of Manufacturing Phase Difference Device
　1.4 Basic Operation of Display Unit
　1.5 Effects
2. Modification Examples 1. Embodiment 1.1 Configuration of Display Unit 1

Figure 1:
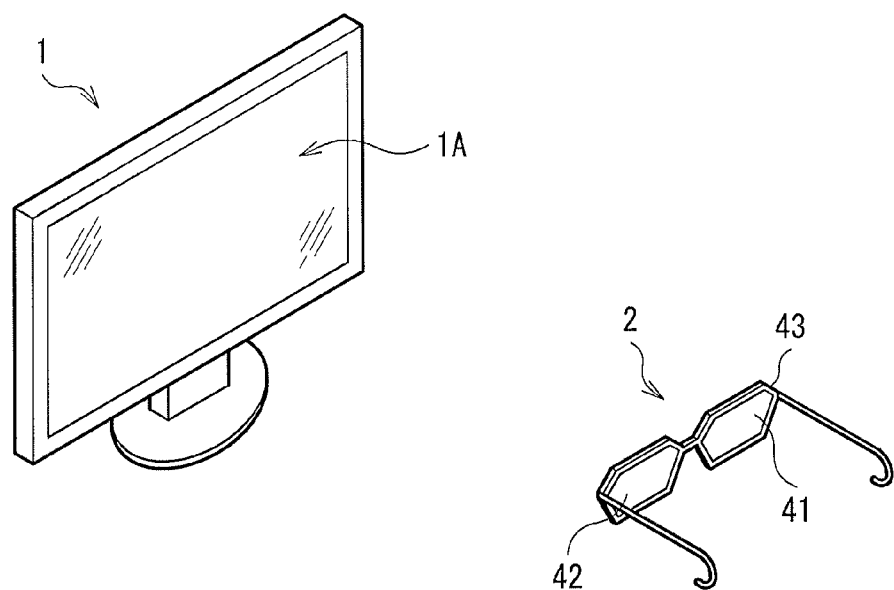
FIG. 1 is a perspective view showing an example of a configuration of a display unit according to an embodiment of the present technology together with polarizing glasses.
Figure 1:
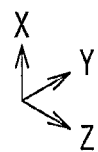
Figure 2:
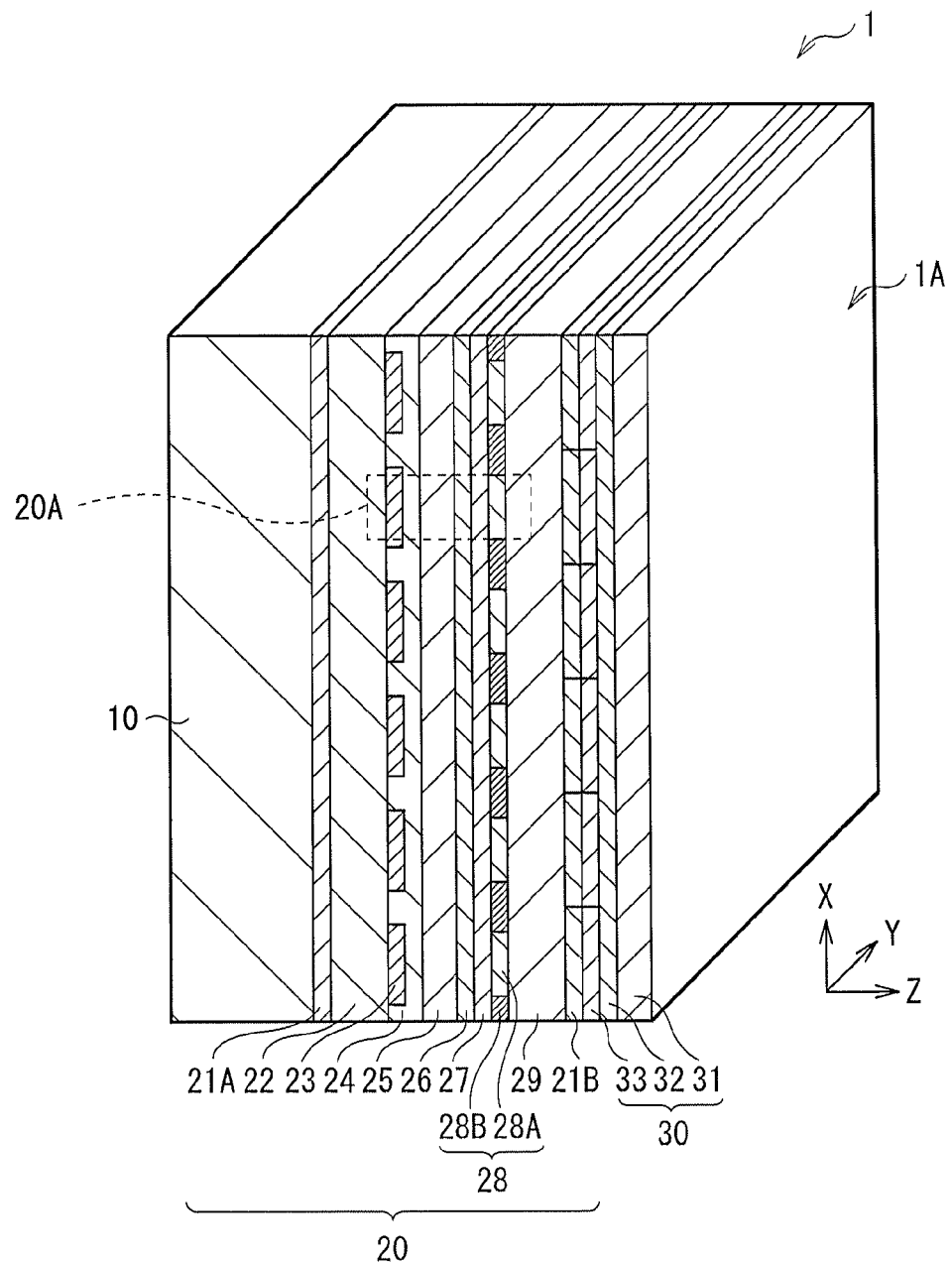
FIG. 2 is a cross-sectional view showing an example of an internal configuration of the display unit in FIG. 1.

FIG. 1 shows a display unit 1 according to an embodiment of the present technology together with polarizing glasses 2 to be hereinafter described as a perspective view. FIG. 2 shows an example of a cross-sectional configuration of the display unit 1 in FIG. 1. The display unit 1 is a display unit adopting a polarizing glasses method in which stereoscopic images are displayed for a viewer (not shown in the drawing) who puts on the polarizing glasses 2 in front of his or her eyes. The display unit 1 is configured of a backlight unit 10, a liquid crystal display panel 20, and a phase difference device 30 that are stacked in this order. In the display unit 1, the front surface of the phase difference device 30 serves as an image display surface 1A, being oriented toward a viewer.

It is to be noted that, in this embodiment, the display unit 1 is arranged in such a manner that the image display surface 1A is parallel to a perpendicular plane (vertical plane). The image display surface 1A may have, for example, a rectangular shape, and a longitudinal direction of the image display surface 1A may be parallel to a horizontal direction (a y-axis direction in the drawing), for example. It is assumed that a viewer views the image display surface 1A with putting on the polarizing glasses 2 in front of his or her eyes. The polarizing glasses 2 are of a circular polarization type, and the display unit 1 is a display unit for circular polarization glasses.

(Backlight Unit 10)

The backlight unit 10 illuminates the liquid crystal display panel 20 from a backside, and may have, for example, a reflective plate, a light source, and an optical sheet (any of these members is not shown in the drawing). The reflective plate returns light that is emitted from the light source back toward the optical sheet, and has functions of reflection, scattering, diffusion, and the like. The light source may be configured, for example, in such a manner that a plurality of linear light sources are arranged in parallel to one another at equal intervals, or a plurality of point-like light sources are arranged two-dimensionally. It is to be noted that examples of the linear light source may include a hot cathode fluorescent lamp (HCFL) and a cold cathode fluorescent lamp (CCFL). Examples of the point-like light source may include a light-emitting diode (LED). The optical sheet may uniform the in-plane luminance distribution of light from the light source or adjust a divergence angle or a polarization state of light from the light source within a desirable range, and may be configured to include, for example, a diffusion plate, a diffusion sheet, a prism sheet, a reflective polarization element, a phase difference plate, and the like. It is to be noted that the light source may be also of an edge-light type, and in such a case, a light guide plate, a light guide film, or the like may be used as necessary.

(Liquid Crystal Display Panel 20)

The liquid crystal display panel 20 is a transmission-type display panel where a plurality of pixels are arranged two-dimensionally, and displays an image by driving each pixel in accordance with an image signal. As shown in FIG. 2, for example, the liquid crystal display panel 20 may have a polarizer 21A, a transparent substrate 22, a pixel electrode 23, an alignment film 24, a liquid crystal layer 25, an alignment film 26, a common electrode 27, a color filter 28, a transparent substrate 29, and a polarizer 21B in order from the backlight unit 10 side.

Here, the polarizer 21A is a polarization plate that is arranged on a light incoming side of the liquid crystal display panel 20, and the polarizer 21B is a polarization plate that is arranged on a light outgoing side of the liquid crystal display panel 20. Each of the polarizers 21A and 21B is a kind of an optical shutter, and transmits only light in a certain vibration direction (polarized light) therethrough. The respective polarizers 21A and 21B may be arranged, for example, in such a manner that polarization axes thereof are different from each other by a predetermined angle (for example, 90 degrees), and this allows light outgoing from the backlight unit 10 to be transmitted therethrough via the liquid crystal layer or to be blocked. It is to be noted that the polarization plate is not limited to a plate-like shape.

A direction of a transmission axis of the polarizer 21A is set within a range that allows light outgoing from the backlight unit 10 to be transmitted therethrough. For example, when a polarization axis of the light outgoing from the backlight unit 10 is oriented in the vertical direction, the transmission axis of the polarizer 21A is also oriented in the vertical direction. When the polarization axis of the light outgoing from the backlight unit 10 is oriented in a horizontal direction, the transmission axis of the polarizer 21A is also oriented in the horizontal direction. It is to be noted that the light outgoing from the backlight unit 10 is not limited to a case of the linearly-polarized light, but may be circularly-polarized light, ellipsoidally-polarized light, or non-polarized light.

A direction of a polarization axis of the polarizer 21B is set within a range that allows light that is transmitted through the liquid crystal display panel 20 to be transmitted therethrough. For example, when the polarization axis of the polarizer 21A is oriented in the horizontal direction, the polarization axis of the polarizer 21B is oriented in a direction (vertical direction) orthogonal to the polarization axis of the polarizer 21A. Alternatively, for example, when the polarization axis of the polarizer 21A is oriented in the vertical direction, the polarization axis of the polarizer 21B is oriented in a direction (horizontal direction) orthogonal to the polarization axis of the polarizer 21A. It is to be noted that the above-described polarization axis and the above-described transmission axis are used as synonyms for each other.

Each of the transparent substrates 22 and 29 is typically a substrate that is transparent to visible light. It is to be noted that, on the transparent substrate 22 on the backlight unit 10 side, for example, an active-type driving circuit may be formed that may include, for example, a TFT (Thin Film Transistor) as a driving element electrically connected with the pixel electrode 23, wiring, and the like. The pixel electrode 23 may be made of, for example, indium tin oxide (ITO), and serves as an electrode for each pixel. Each of the alignment films 24 and 26 may be made of a polymeric material such as polyimide, and performs an alignment treatment on liquid crystal. The liquid crystal layer 25 may be made of, for example, a liquid crystal of a VA (Vertical Alignment) mode, an IPS (In-Plane Switching) mode, a TN (Twisted Nematic) mode, or an STN (Super Twisted Nematic) mode. The liquid crystal layer 25 has a function of transmitting or blocking the light outgoing from the backlight unit 10 therethrough for each pixel based on a voltage applied from the driving circuit that is not shown in the drawing. The common electrode 27 may be made of, for example, ITO, and serves as a common counter electrode for each of the pixel electrodes 23.

The color filter 28 has a plurality of filter sections 28A that are arranged in correspondence with the pixel electrodes 23, and a black matrix section 28B that is arranged in correspondence with a peripheral region of the pixel electrodes 23. The filter section 28A has light transmission characteristics, and separates the light from the backlight unit 10 into, for example, red, green, or blue light. The black matrix section 28B has light-shielding characteristics. In the liquid crystal display panel 20, a portion facing the filter section 28A configures a pixel 20A in the liquid crystal display panel 20, and the filter section 28A is arranged on the image display surface 1A side in the pixel 20A.

(Phase Difference Device 30)

Figure 3:
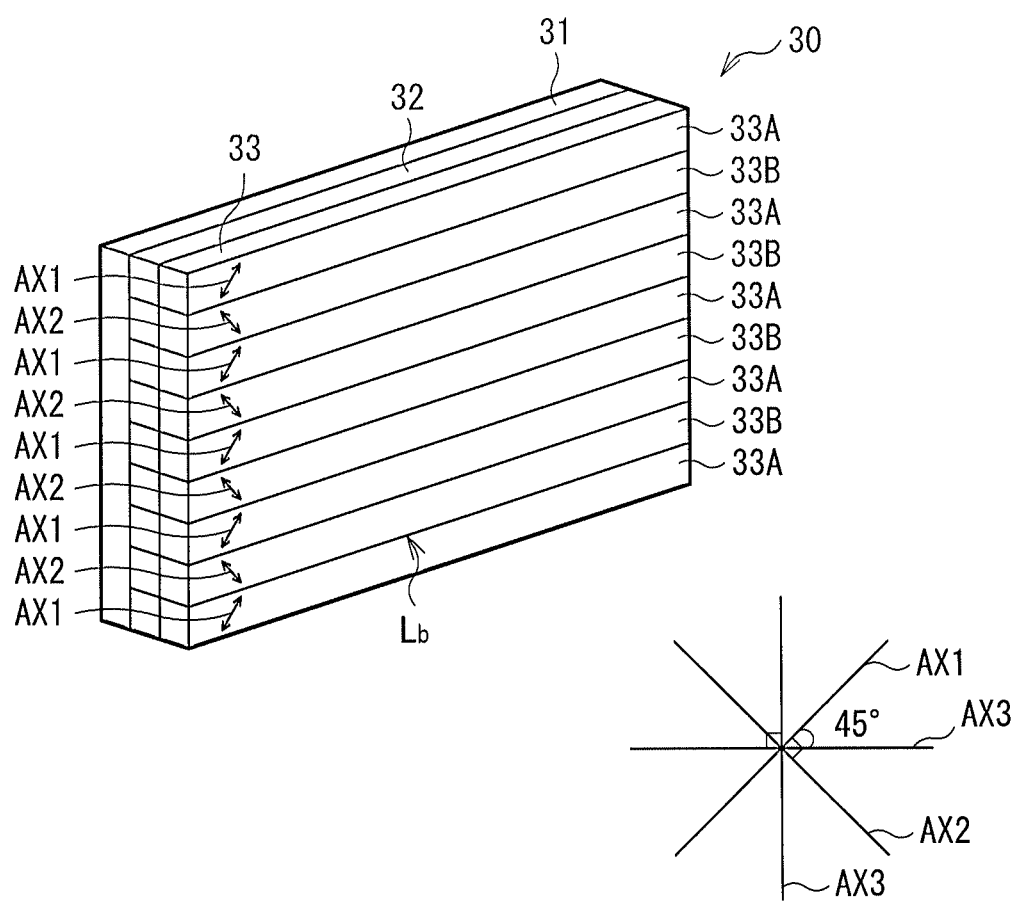
FIG. 3 is a cross-sectional view showing an example of a configuration of a phase difference device in FIG. 2.

Next, the description is provided on the phase difference device 30. FIG. 3 shows an example of a configuration of the phase difference device 30 as a perspective view. The phase difference device 30 varies a polarization state of light that is transmitted through the polarizer 21B of the liquid crystal display panel 20. The phase difference device 30 is bonded to the front surface (polarizer 21B) on the light outgoing side of the liquid crystal display panel 20 using an adhesive (not shown in the drawing) and/or the like. As shown in FIG. 2, the phase difference device 30 may have a base material 31, an alignment film 32, and a phase difference layer 33 in order from the image display surface 1A side. It is to be noted that the base material 31, the alignment film 32, and the phase difference layer 33 may be alternatively arranged in this order from the liquid crystal display panel 20 side, which is not shown in the drawing.

The base material 31 supports the alignment film 32 and the phase difference layer 33, and may be configured of, for example, a transparent resin film. As the transparent resin film, a film with small optical anisotropy, that is, small birefringence may be preferable. The alignment film 32 has a function of performing a specific alignment on an alignment material such as liquid crystal. The alignment film 32 may be made of a transparent resin such as UV curable, electron beam curable, and thermoplastic transparent resin. The alignment film 32 is provided on the surface of the base material 31, and may have, for example, two kinds of alignment regions (right-eye alignment region 32A and left-eye alignment region 32B) that are different from each other in the alignment direction as shown in (A) of FIG. 4. The right-eye alignment region 32A and the left-eye alignment region 32B may each have, for example, a band-like shape that extends in one common direction (horizontal direction), and may be arranged alternately in a shorter-side direction (vertical direction) of the right-eye alignment region 32A and the left-eye alignment region 32B. A side section that extends in a longitudinal direction (horizontal direction) of the right-eye alignment region 32A and a side section that extends in a longitudinal direction (horizontal direction) of the left-eye alignment region 32B are in contact with each other. The right-eye alignment region 32A and the left-eye alignment region 32B are arranged in correspondence with the pixel 20A in the liquid crystal display panel 20, and may be arranged, for example, at a pitch corresponding to a pixel pitch in a shorter-side direction (vertical direction) of the liquid crystal display panel 20.

Figure 4:
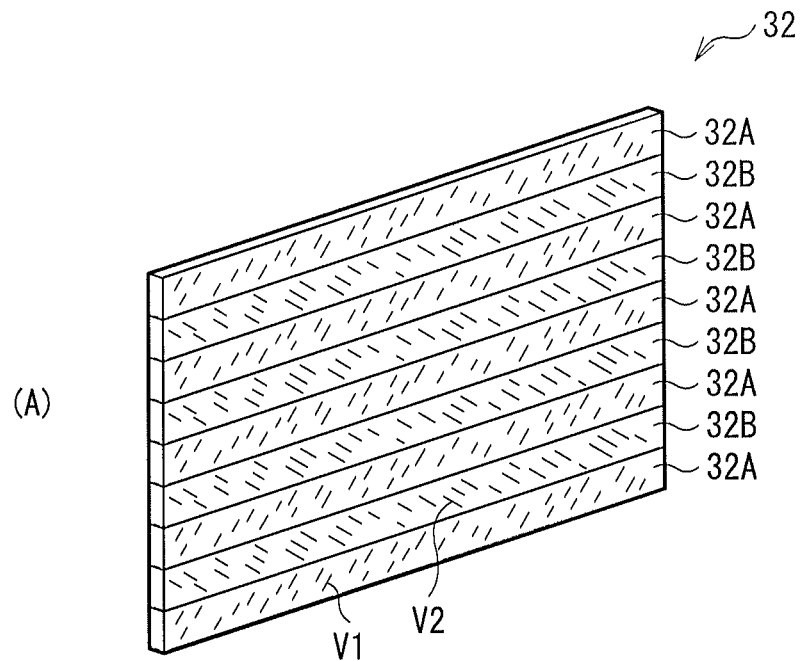
FIGS. 4A and 4B is a cross-sectional view showing an example of a configuration of an alignment film in FIG. 3.
Figure 4:
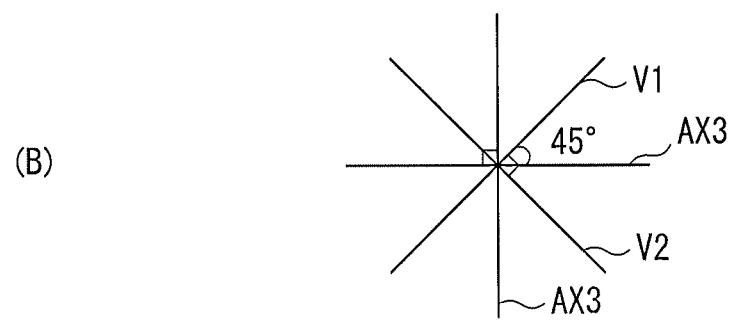

For example, as shown in (A) and (B) of FIG. 4, the right-eye alignment region 32A may have a plurality of grooves V1 that extend in a direction intersecting with a polarization axis AX3 of the polarizer 21B at an angle of 45 degrees. On the other hand, for example, as shown in (A) and (B) of FIG. 4, the left-eye alignment region 32B may have a plurality of grooves V2 that extend in a direction intersecting with the polarization axis AX3 of the polarizer 21B at an angle of 45 degrees and being orthogonal to an extending direction of the grooves V1. For example, as shown in (A) and (B) of FIG. 4, each of the grooves V1 and V2 may extend in an oblique direction at an angle of 45 degrees when the polarization axis AX3 of the polarizer 21B is oriented in the vertical direction or the horizontal direction. Alternatively, when the polarization axis AX3 of the polarizer 21B is oriented in the oblique direction at an angle of 45 degrees, the grooves V1 may extend, for example, in the horizontal direction, and the grooves V2 may extend, for example, in the vertical direction, which is not shown in the drawing.

Each of the grooves V1 may extend linearly in one direction, or may extend in one direction while wobbling (winding its way), for example. A cross-sectional shape of each of the grooves V1 may have a V-like shape, for example. Similarly, a cross-sectional shape of each of the grooves V2 may also have a V-like shape, for example. In other words, a cross-sectional shape of whole of the right-eye alignment region 32A and the left-eye alignment region 32B has a sawtooth-like shape. In a groove structure thereof, a pitch may be preferably small to be equal to or smaller than several micrometers, and may be more preferably small to be equal to or less than several hundred nanometers. Such a shape may be formed in a lump by transfer using a mold, for example. Alternatively, the alignment film 32 may not have the groove structure described above, and may be a photo-alignment film that is formed by irradiation of polarized UV light. It is possible to manufacture the photo-alignment film in such a manner that a material which is to be aligned in a polarization direction of UV light at the time of irradiation of the polarized UV light is applied in advance and UV light polarized in different directions is irradiated onto the right-eye alignment region 32A and the left-eye alignment region 32B.

The phase difference layer 33 is a thin layer having optical anisotropy. This phase difference layer 33 may be provided on the surfaces of the right-eye alignment region 32A and the left-eye alignment region 32B, for example. As shown in FIG. 3, the phase difference layer 33 may have two kinds of phase difference regions (right-eye phase difference region 33A and left-eye phase difference region 33B) that are different from each other in the direction of a slow axis.

The right-eye phase difference region 33A is formed on the right-eye alignment region 32A, and the left-eye phase difference region 33B is formed on the left-eye alignment region 32B. Therefore, as with the right-eye alignment region 32A and the left-eye alignment region 32B, the respective right-eye phase difference region 33A and left-eye phase difference region 33B have a band-like shape that extends in one common direction (horizontal direction). Further, the right-eye phase difference regions 33A and the left-eye phase difference regions 33B are arranged alternately in a shorter-side direction (vertical direction) of the right-eye phase difference region 33A and the left-eye phase difference region 33B. A side section that extends in a longitudinal direction (horizontal direction) of the right-eye phase difference region 33A and a side section that extends in a longitudinal direction (horizontal direction) of the left-eye phase difference region 33B are in contact with each other, and a borderline Lb on which the side sections are in contact with each other extend in the horizontal direction. The right-eye phase difference region 33A and the left-eye phase difference region 33B are in correspondence with the pixel 20A in the liquid crystal display panel 20, and may be arranged at a pitch corresponding to a pixel pitch in a shorter-side direction (vertical direction) of the liquid crystal display panel 20. It is to be noted that a relationship between the pixel 20A in the liquid crystal display panel 20 and the phase difference device 30 is described later in details.

As shown in FIG. 3, the right-eye phase difference region 33A may have, for example, a slow axis AX1 in a direction intersecting with the polarization axis AX3 of the polarizer 21B at an angle of 45 degrees. On the other hand, as shown in FIG. 3, the left-eye phase difference region 33B may have, for example, a slow axis AX2 in a direction intersecting with the polarization axis AX3 of the polarizer 21B at an angle of 45 degrees and being orthogonal to the slow axis AX1. As shown in FIG. 3, each of the slow axes AX1 and AX2 may be oriented in an oblique direction at an angle of 45 degrees when the polarization axis AX3 of the polarizer 21B is oriented in the vertical direction or the horizontal direction. Alternatively, when the polarization axis AX3 of the polarizer 21B is oriented in the oblique direction at an angle of 45 degrees, the slow axis AX1 may extend, for example, in the horizontal direction, and the slow axis AX2 may be oriented, for example, in the vertical direction, which is not shown in the drawing. The slow axis AX1 is oriented in an extending direction of the grooves V1, while the slow axis AX2 is oriented in an extending direction of the grooves V2.

Figure 5:
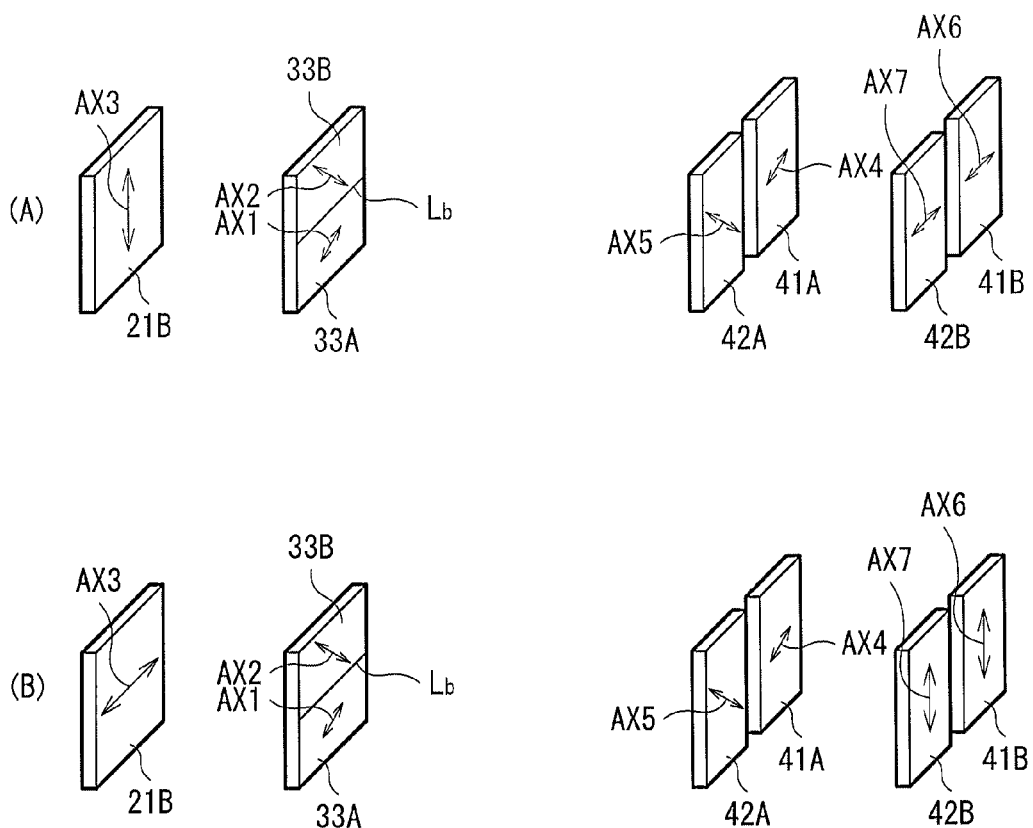
FIGS. 5A and 5B is a conceptual diagram showing an example of a slow axis for each of a right-eye phase difference region and a left-eye phase difference region in FIG. 3 together with a slow axis or a transmission axis of other optical member.

Further, for example, as shown in (A) and (B) of FIG. 5, the slow axis AX1 may be oriented in the direction same as a direction of a slow axis AX4 of a right-eye phase difference plate 41A (to be described later) on the polarizing glasses 2, and may be oriented in a direction different from a direction of a slow axis AX5 of a left-eye phase difference plate 42A (to be described later) in the polarizing glasses 2. On the other hand, for example, the slow axis AX2 may be oriented in a direction same as the direction of the slow axis AX5, and may be oriented in a direction different from the direction of the slow axis AX4.

The phase difference layer 33 may be configured to include a polymerized high-molecular liquid crystal material, for example. In other words, in the phase difference layer 33, an alignment state of liquid crystal molecules is fixed. As the high-molecular liquid crystal material, a material is used that is selected according to a phase transition temperature (liquid crystal phase-isotropic phase), wavelength dispersion characteristics of refractive index, viscosity characteristics, a process temperature of a liquid crystal material, etc.

In the phase difference layer 33, long axes of liquid crystal molecules are arranged along the extending direction of the grooves V1 in the vicinity of an interface between the groove V1 and the right-eye phase difference region 33A, and the long axes of the liquid crystal molecules are arranged along the extending direction of the grooves V2 in the vicinity of an interface between the groove V2 and the left-eye phase difference region 33B. In other words, based on the shapes and the extending directions of the grooves V1 and V2, an alignment of the liquid crystal molecules is controlled, and optical axes of the right-eye phase difference region 33A and the left-eye phase difference region 33B are set.

Further, in the phase difference layer 33, retardation values of the right-eye phase difference region 33A and the left-eye phase difference region 33B are set by adjusting constituent materials, thicknesses, and/or the like of the right-eye phase difference region 33A and the left-eye phase difference region 33B. When the base material 31 has a phase difference, such retardation values may be preferably set in consideration of the phase difference of the base material 31 as well. It is to be noted that, in this embodiment, the right-eye phase difference region 33A and the left-eye phase difference region 33B are configured of the same material with the same thickness, and therefore, absolute values of retardation are equal to each other.

1.2 Configuration of Polarizing Glasses 2

Figure 6:
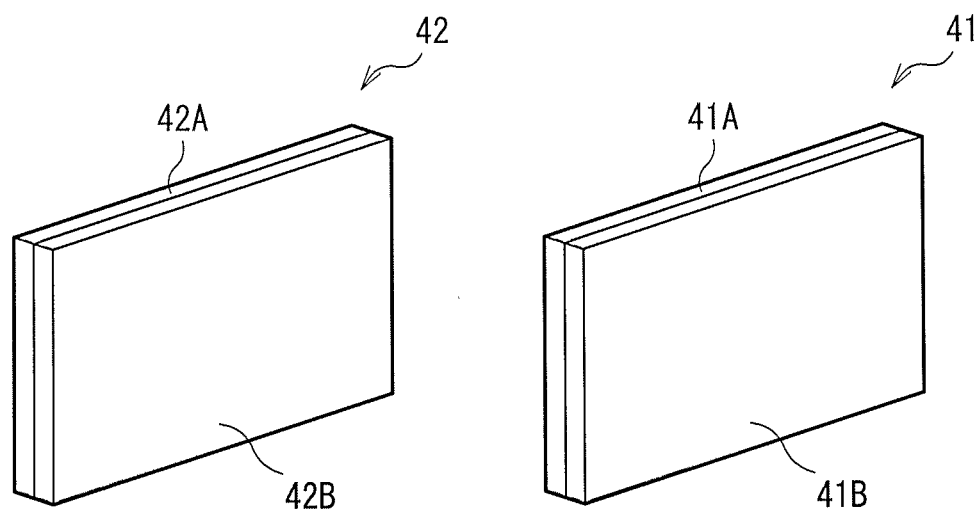
FIG. 6 is a perspective view showing an example of a configuration of a right-eye optical device and a left-eye optical device of the polarizing glasses in FIG. 1.

Next, description is provided on the polarizing glasses 2 with reference to FIG. 1 and FIG. 6. The polarizing glasses 2 are put on in front of eyes of a viewer (not shown in the drawing), and are used by the viewer in viewing images appearing on the image display surface 1A of the display unit 1. These polarizing glasses 2 may be, for example, circularly-polarizing glasses 2, and may have the right-eye optical device 41, the left-eye optical device 42, and a frame 43 as shown in FIG. 1.

The frame 43 supports the right-eye optical device 41 and the left-eye optical device 42. The frame 43 is not specifically limited in a shape, but the frame may have, for example, a shape of being held on a nose and ears of a viewer (not shown in the drawing) as shown in FIG. 1. The right-eye optical device 41 and the left-eye optical device 42 are used in a state to be opposed to the image display surface 1A of the display unit 1. As shown in FIG. 1, the right-eye optical device 41 and the left-eye optical device 42 may be preferably used in a state of being arranged in one horizontal plane as much as possible; however, the right-eye optical device 41 and the left-eye optical device 42 may be used in a state of being arranged in a slightly inclined flat plane.

As shown in FIG. 6, the right-eye optical device 41 may have, for example, a right-eye phase difference plate 41A and a polarization plate 41B. The right-eye phase difference plate 41A and the polarization plate 41B are arranged in order from the display unit 1 side. On the other hand, as shown in FIG. 6, the left-eye optical device 42 may have, for example, a left-eye phase difference plate 42A and a polarization plate 42B. The left-eye phase difference plate 42A and the polarization plate 42B are arranged in order from the display unit 1 side.

The right-eye optical device 41 and the left-eye optical device 42 may have members other than those exemplified above. For example, on the surface on the light outgoing side (viewer side) of the right-eye optical device 41 and the left-eye optical device 42, there may be provided a protective film (not shown in the drawing) for preventing broken pieces from shattering toward eyes of a viewer in the event of breakage of the polarization plates 41B and 42B, a coating layer (not shown in the drawing) for protection purpose, or the like. Further, each of the right-eye optical device 41 and the left-eye optical device 42 may have, for example, a flat plate-like shape as shown in FIG. 6, or may have a curved shape that is projecting toward the light outgoing side, which is not shown in the drawing.

The polarization plates 41B and 42B allow only light (polarized light) in a certain vibration direction to pass therethrough. For example, as shown in (A) and (B) of FIG. 5, each of polarization axes AX6 and AX7 of the polarization plates 41B and 42B may be oriented in a direction orthogonal to the polarization axis AX3 of the polarization plate 21B in the display unit 1. Each of the polarization axes AX6 and AX7 may be oriented, for example, in the horizontal direction when the polarization axis AX3 of the polarization plate 21B is oriented in the vertical direction as shown in (A) of FIG. 5, and each of the polarization axes AX6 and AX7 may be oriented, for example, in the vertical direction when the polarization axis AX3 of the polarization plate 21B is oriented in the horizontal direction as shown in (B) of FIG. 5. Alternatively, when the polarization axis AX3 of the polarization plate 21B is oriented in an oblique direction at an angle of 45 degrees, the polarization axes AX6 and AX7 are oriented in a direction orthogonal to such a direction (at an angle of −45 degrees), which is not shown in the drawing.

The right-eye phase difference plate 41A and the left-eye phase difference plate 42A are thin layers or films having optical anisotropy. The slow axis AX4 of the right-eye phase difference plate 41A is oriented in a direction intersecting with the polarization axis AX6 at an angle of 45 degrees as shown in (A) and (B) of FIG. 5. Further, the slow axis AX5 of the left-eye phase difference plate 42A is oriented in a direction intersecting with the polarization axis AX7 at an angle of 45 degrees and is oriented in a direction orthogonal to the slow axis AX4 as shown in (A) and (B) of FIG. 5. For example, as shown in (A) and (B) of FIG. 5, each of the slow axes AX4 and AX5 may be oriented in a direction intersecting with both of the horizontal direction and the vertical direction when the polarization axes AX6 and AX7 are oriented in the horizontal direction or the vertical direction as shown in (A) and (B) of FIG. 5. Alternatively, when the polarization axes AX6 and AX7 are oriented in the oblique direction at an angle of 45 degrees, the slow axis AX4 may be oriented, for example, in the horizontal direction, and the slow axis AX5 may be oriented, for example, in the vertical direction, which is not shown in the drawing.

Further, the slow axis AX4 is oriented in a direction same as the direction of the slow axis AX1 of the right-eye phase difference region 33A, and is oriented in a direction different from the direction of the slow axis AX2 of the left-eye phase difference region 33B. On the other hand, the slow axis AX5 is oriented in a direction same as that of the slow axis AX2, and is oriented in a direction different from the direction of the slow axis AX1.

(Relationship Between Pixel 20A and Phase Difference Device 30)

Figure 7:
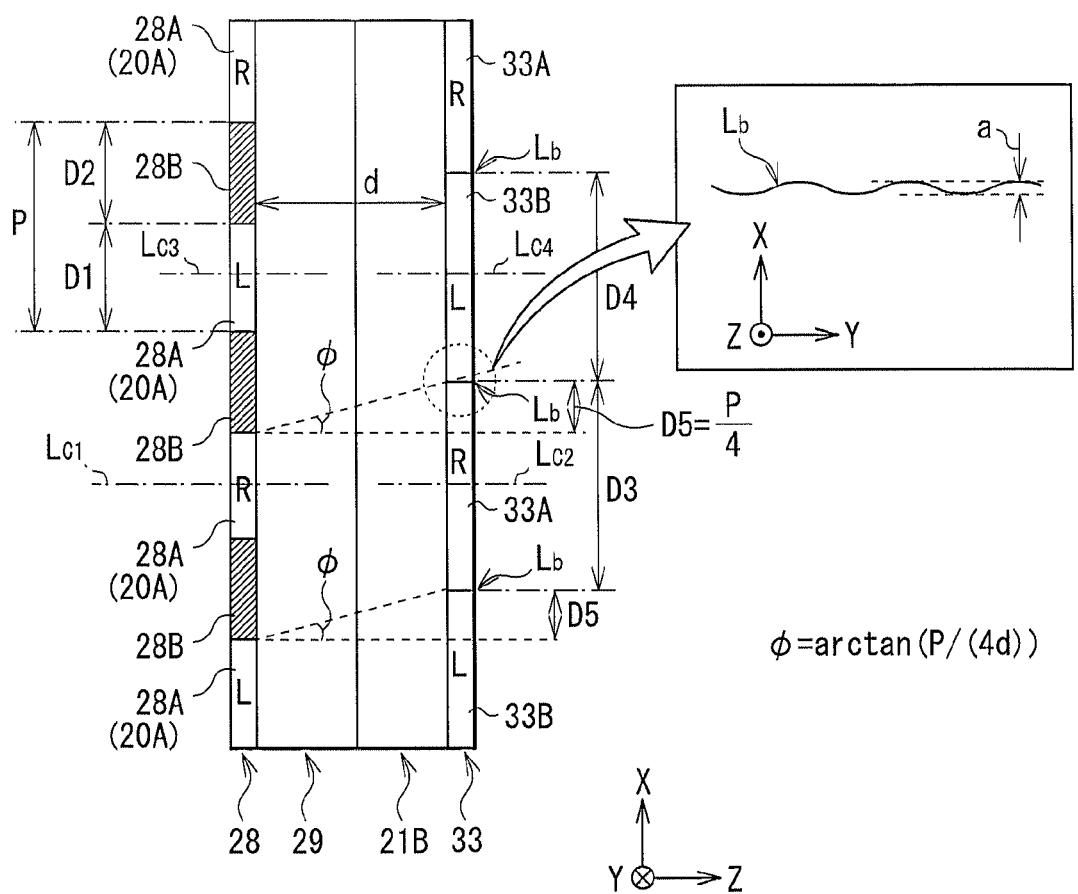
FIG. 7 is a cross-sectional view showing a part of a display panel and the phase difference device in FIG. 2 in an enlarged manner.

Next, description is provided on a relationship between the pixel 20A and the phase difference device 30. FIG. 7 shows a part of cross-section of the liquid crystal display panel 20 and the phase difference device 30 in an enlarged manner. In the liquid crystal display panel 20, the pixels 20A generating right-eye image light (portions denoted as R in the drawing) and the pixels 20A generating left-eye image light (portions denoted as L in the drawing) are arranged alternately for each pixel row. Between the right-eye pixel 20A and the left-eye pixel 20A that are located next to each other in a direction (vertical direction) orthogonal to the pixel row, there is provided a black matrix section 28B. Further, also in a direction (horizontal direction) parallel to the pixel row, between the adjacent right-eye pixels 20A, there is provided the black matrix section 28B, which is not shown in FIG. 7. Similarly, in the direction (horizontal direction) parallel to the pixel row, between the adjacent left-eye pixels 20A, there is also provided the black matrix section 28B. On the image display surface 1A side of the right-eye pixel 20A, a filter section 28A is provided, and this filter section 28A serves as an aperture of the right-eye pixel 20A. In a similar manner, also on the image display surface 1A side of the left-eye pixel 20A as well, the filter section 28A is provided, and this filter section 28A serves as an aperture of the left-eye pixel 20A. A width D1 of each filter section 28A in the vertical direction and a distance D2 between the filter sections 28A that are adjacent to each other in the vertical direction are equal to each other.

Between the pixel 20A and the phase difference device 30, the transparent substrate 29 and the polarizer 21B are arranged. Therefore, a total thickness of the transparent substrate 29 and the polarizer 21B defines a distance d between the pixel 20A and the phase difference device 30. Further, the right-eye phase difference region 33A in the phase difference layer 33 is arranged in such a manner that a centerline Lc1 of the right-eye pixel 20A (filter section 28A) in the vertical direction and a centerline Lc2 of the right-eye phase difference region 33A in the vertical direction are placed in the same plane. Similarly, the left-eye phase difference region 33B in the phase difference layer 33 is arranged in such a manner that a centerline Lc3 of the left-eye pixel 20A (filter section 28A) in the vertical direction and a centerline Lc4 of the left-eye phase difference region 33B in the vertical direction are placed in the same plane. Moreover, a width D3 of the right-eye phase difference region 33A in the vertical direction is equal to the pixel 20A pitch P, and a width D4 of the left-eye phase difference region 33B in the vertical direction is also equal to the pixel 20A pitch P. Accordingly, a shift amount D5 between the borderline Lb and a top end of the pixel 20A as well as the distance d defines an amount of leakage of right-eye image light into the left-eye phase difference region 33B and an amount of leakage of left-eye image light into the right-eye phase difference region 33A. More specifically, an angle $\phi(=\arctan(D5/d))=\arctan(P/(4d)))$ obtained using the shift amount D5 and the distance d has a correlation with the above-described amounts of leakage.

Meanwhile, an example of a configuration of the borderline Lb is shown in a boxed area in the upper right of FIG. 7. The borderline Lb has the waviness with the amplitude a satisfying Expressions (1) to (3) given below. Here, amax ($\phi$) is a maximum value of the amplitude a when a value of worse one of two kinds of crosstalk that are defined by the following Expressions (4) and (5) becomes 5%. It is to be noted that the following Expressions (4) and (5) cover a range of a vertical viewing angle+/−5 degrees as a targeted viewing direction.

$$0 < a < a\max(\phi) \quad (1)$$

$$a\max(\phi) = -0.7/(\phi - 1.2) + 0.35 \quad (2)$$

$$\phi = \arctan(P/(4d)) \quad (3)$$

Crosstalk of left-eye image light=(luminance at the time when the left-eye image light is viewed through the right-eye optical device 41 of the polarizing glasses 2)/(luminance at the time when the left-eye image light is viewed through the left-eye optical device 42 of the polarizing glasses 2) (4)

Crosstalk of right-eye image light=(luminance at the time when the right-eye image light is viewed through the left-eye optical device 42 of the polarizing glasses 2)/(luminance at the time when the right-eye image light is viewed through the right-eye optical device 41 of the polarizing glasses 2) (5)

The borderline Lb may be ideally linear; however, the borderline Lb has a wavy shape contrary to expectation when actually observed with an optical microscope. It is likely that the waviness of the borderline Lb becomes larger when the alignment film 32 is configured of a photo-alignment film, and becomes smaller when the alignment film 32 is manufactured by a manufacturing method (mold transfer) to be described later. In fact, a borderline of a photo-alignment film was measured with one of commercially-available display units, waviness of the borderline Lb was so large that Expressions above were not satisfied.

Figure 8:
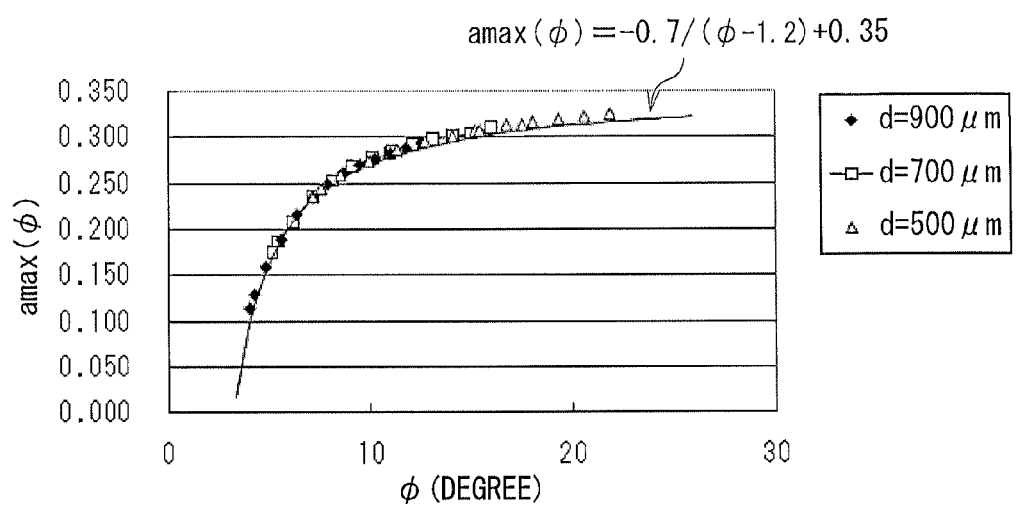
FIG. 8 is a diagram showing a relationship between $\phi$ and amax ($\phi$).

When the waviness of the borderline Lb becomes so large that Expressions above are not satisfied, crosstalk may be worse due to the waviness of the borderline Lb. Therefore, it is possible to reduce deterioration in the crosstalk by reducing the waviness of the borderline Lb as much as possible. FIG. 8 determines, from simulation, a relationship between an angle $\phi$ and amax ($\phi$) at the crosstalk of 5%. Rhombic dots in FIG. 8 represent a result in a case of d=900 μm, square dots in FIG. 8 represent a result in a case of d=700 μm, and triangular dots in FIG. 8 represent a result in a case of d=500 μm. It is to be noted that FIG. 8 shows a result under assumption that the pixel 20A and the phase difference device 30 have the relationship described in FIG. 7. The simulation result shown in FIG. 8 indicates that it is possible to suppress the crosstalk down to 5% or less when amax $(\phi) \leq -0.7/(\phi-1.2)+0.35$ is satisfied.

Figure 9:
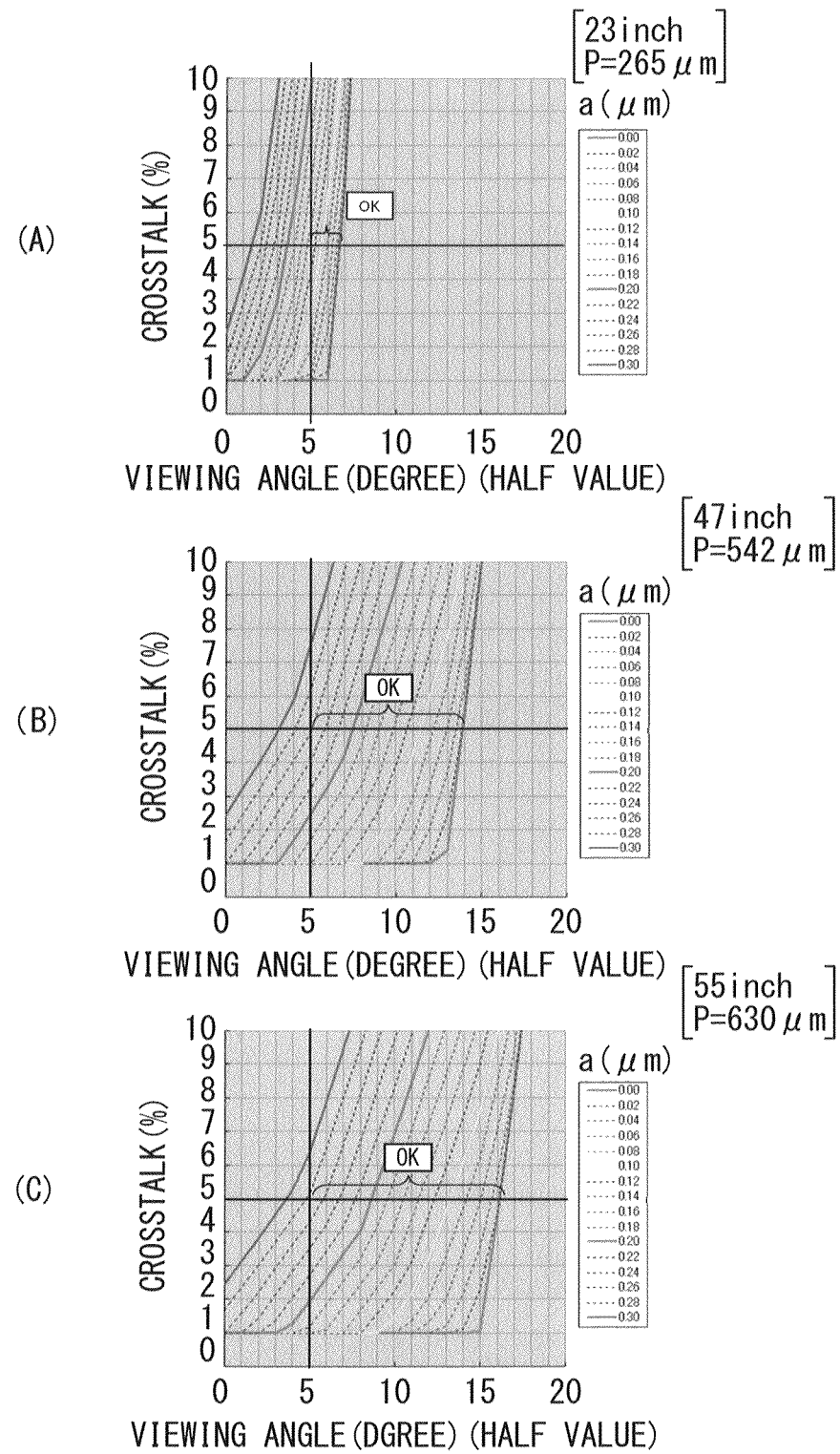
FIGS. 9A through 9C is a diagram showing a relationship between a viewing angle and crosstalk.

FIG. 9 determines a relationship between a viewing angle and a crosstalk from simulation. (A) of FIG. 9 shows a result under a condition of a panel size of 23 inches and a pixel pitch of 265 μm, (B) of FIG. 9 shows a result under a condition of a panel size of 47 inches and a pixel pitch of 542 μm, and (C) of FIG. 9 shows a result under a condition of a panel size of 55 inches and a pixel pitch of 630 μm. It is to be noted that, it is to be noted that FIG. 9 shows results under assumption that the pixel 20A and the phase difference device 30 have the relationship described in FIG. 7. FIG. 9 indicates that a maximum value of the amplitude a that allows the crosstalk to be suppressed down to 5% or less becomes larger with an increase in the pixel pitch, that is, with an increase in the angle $\phi$. Further, FIG. 9 also indicates that a maximum value of the viewing angle that allows the crosstalk to be suppressed down to 5% or less also becomes larger with the increase in the pixel pitch.

1.3 Method of Manufacturing Phase Difference Device 30

Next, description is provided on an example of a method of manufacturing the phase difference device 30. Hereinafter, description is provided on a case where the alignment film 32 that is included in the phase difference device 30 is manufactured using a plate-like master; however, it goes without saying that the alignment may be alternatively manufactured using a roll-shaped master as a matter of course.

Figure 10:
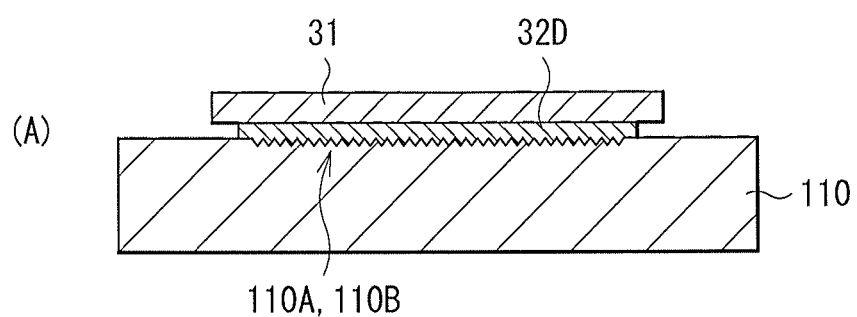
FIGS. 10A and 10B is a schematic diagram for explaining an example of a method of manufacturing the phase difference device in FIG. 2.
Figure 10:
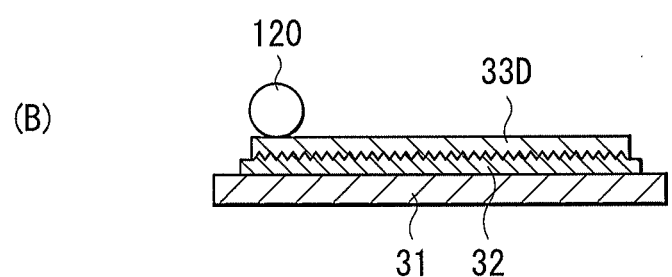

Each of (A) and (B) of FIG. 10 shows a process for manufacturing the phase difference device 30. First, a plate-like master 110 is prepared that has a surface on which a plurality of concave-convex regions 110A having reverse patterns of the concaves and convexes of the surface of the right-eye alignment region 32A and a plurality of concave-convex regions 110B having reverse patterns of the concaves and convexes of the surface of the left-eye alignment region 32B are formed alternately. Next, a UV curable resin layer 32D containing, for example, UV curable acrylic resin liquid may be placed on the surface of the master 110, and then, the UV curable resin layer 32D is sealed with the base material 31 ((A) of FIG. 10). Subsequently, ultraviolet light is irradiated onto the UV curable resin layer 32D to harden the UV curable resin layer 32D, which is not shown in the drawing. Thus, the alignment film 32 where the right-eye alignment regions 32A and the left-eye alignment regions 32B are arranged alternately is formed on the base material 31. Thereafter, the master 110 is peeled off.

Next, a liquid crystal layer 33D containing liquid-crystalline monomer may be formed on the surface of the alignment film 32 in a manner of coating with the use of a roll coater 120, for example ((B) of FIG. 10). On this occasion, a solvent for dissolving the liquid-crystalline monomer, a polymerization initiator, a polymerization inhibitor, a surfactant, a leveling agent, and/or the like may be used for the liquid crystal layer 33D as necessary. The solvent is not specifically limited; however, a solvent that has high solubility for the liquid-crystalline monomer, has a low vapor pressure at room temperature, and is less likely to be evaporated at room temperature may be preferably used. Examples of the solvent that is less likely to be evaporated at room temperature may include 1-methoxy-2-acetoxypropane (PGMEA), toluene, methylethylketone (MEK), and methyl isobutyl ketone (MIBK). This is because, when the solvent that is easily evaporated at room temperature is used, evaporation rate of the solvent after formation of the liquid crystal layer 33D by coating becomes excessively fast, and the alignment of the liquid-crystalline monomer to be formed after the evaporation of a solvent is easily disturbed.

Subsequently, an alignment treatment (heating treatment) for the liquid-crystalline monomer of the liquid crystal layer 33D is performed, which is not shown in the drawing. This heating treatment is carried out at temperature equal to or higher than phase transition temperature of the liquid-crystalline monomer. In particular, when a solvent is used, such a heating treatment is carried out at temperature equal to or higher than temperature at which this solvent dries. Here, due to coating with the liquid-crystalline monomer in the preceding process, sheer stress may be often caused at an interface between the liquid-crystalline monomer and the alignment film 32, and a flow-induced alignment (flow alignment) or a force-induced alignment (external force alignment) is caused. Therefore, liquid crystal molecules may be aligned in a direction which is not intended. The above-described heating treatment is performed to once cancel such an alignment state of the liquid-crystalline monomer that has been aligned in the direction which has not been intended. As a result, in the liquid crystal layer 33D, the solvent dries and only the liquid-crystalline monomer is present. The state of the liquid-crystalline monomer is in an isotropic phase.

Thereafter, the liquid crystal layer 33D is cooled gradually down to temperature slightly lower than the phase transition temperature, which is not shown in the drawing. As a result, the liquid-crystalline monomer is aligned in accordance with patterns of the right-eye alignment region 32A and the left-eye alignment region 32B that are formed on the surface of the alignment film 32. In other words, the liquid-crystalline monomer is aligned in the extending direction of the grooves V1 and the grooves V2.

Subsequently, the liquid-crystalline monomer is polymerized in a manner of, for example, irradiating UV light to the liquid crystal layer 33D for which the alignment treatment has been completed, which is not shown in the drawing. It is to be noted that, on this occasion, treatment temperature is often near room temperature in general; however, the treatment temperature may be increased up to temperature equal to or lower than the phase transition temperature. As a result, the alignment state of the liquid crystal molecules is fixed in the extending direction of the grooves V1 and the grooves V2 and thereby, the right-eye phase difference region 33A and the left-eye phase difference region 33B are formed. In the above-described manner, the phase difference device 30 is completed.

1.4 Basic Operation

Figure 11:
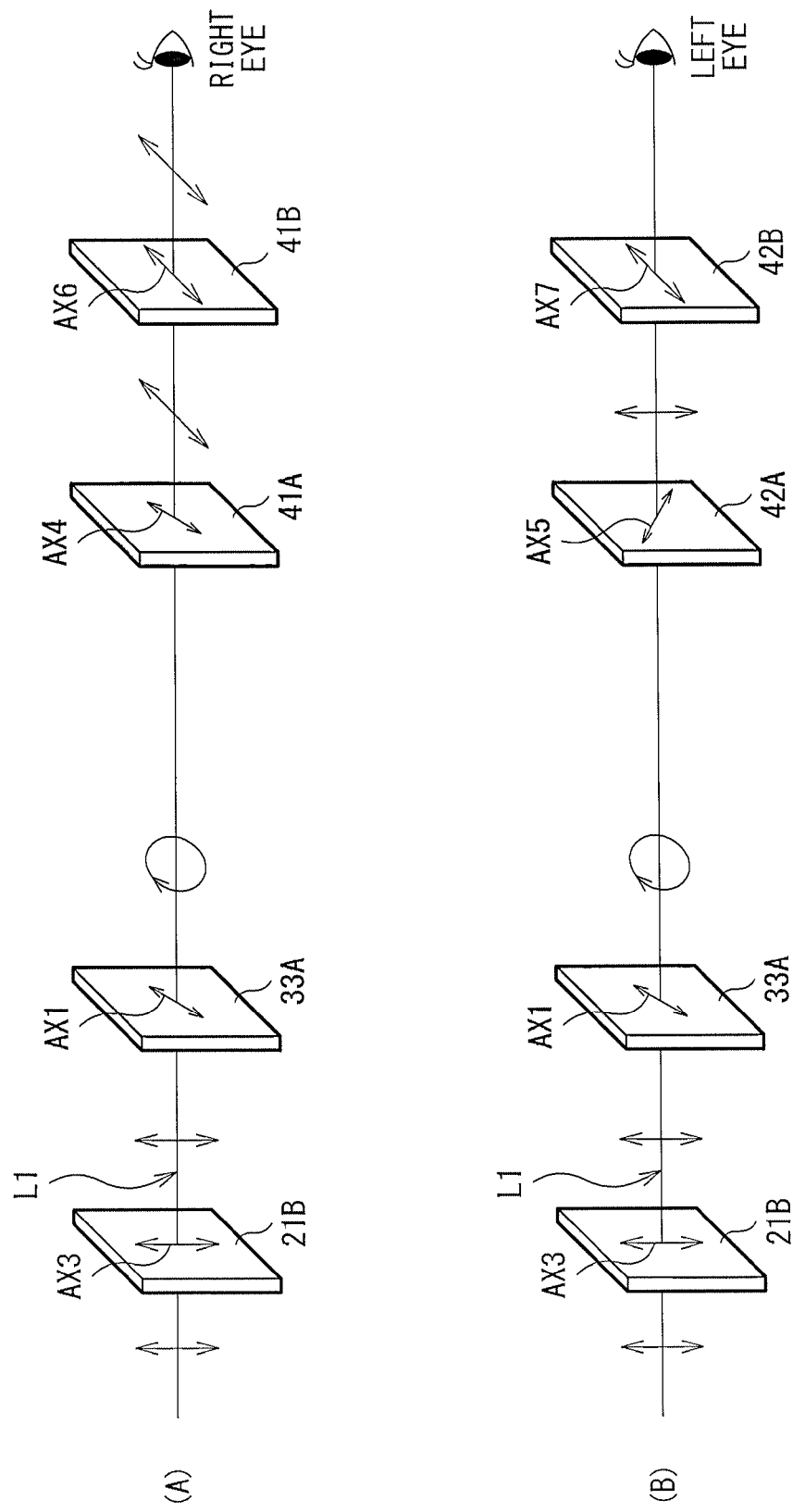
FIGS. 11A and 11B is a conceptual diagram for explaining an example of a slow axis and a transmission axis in viewing images on the display unit in FIG. 1 with a right eye.
Figure 14:
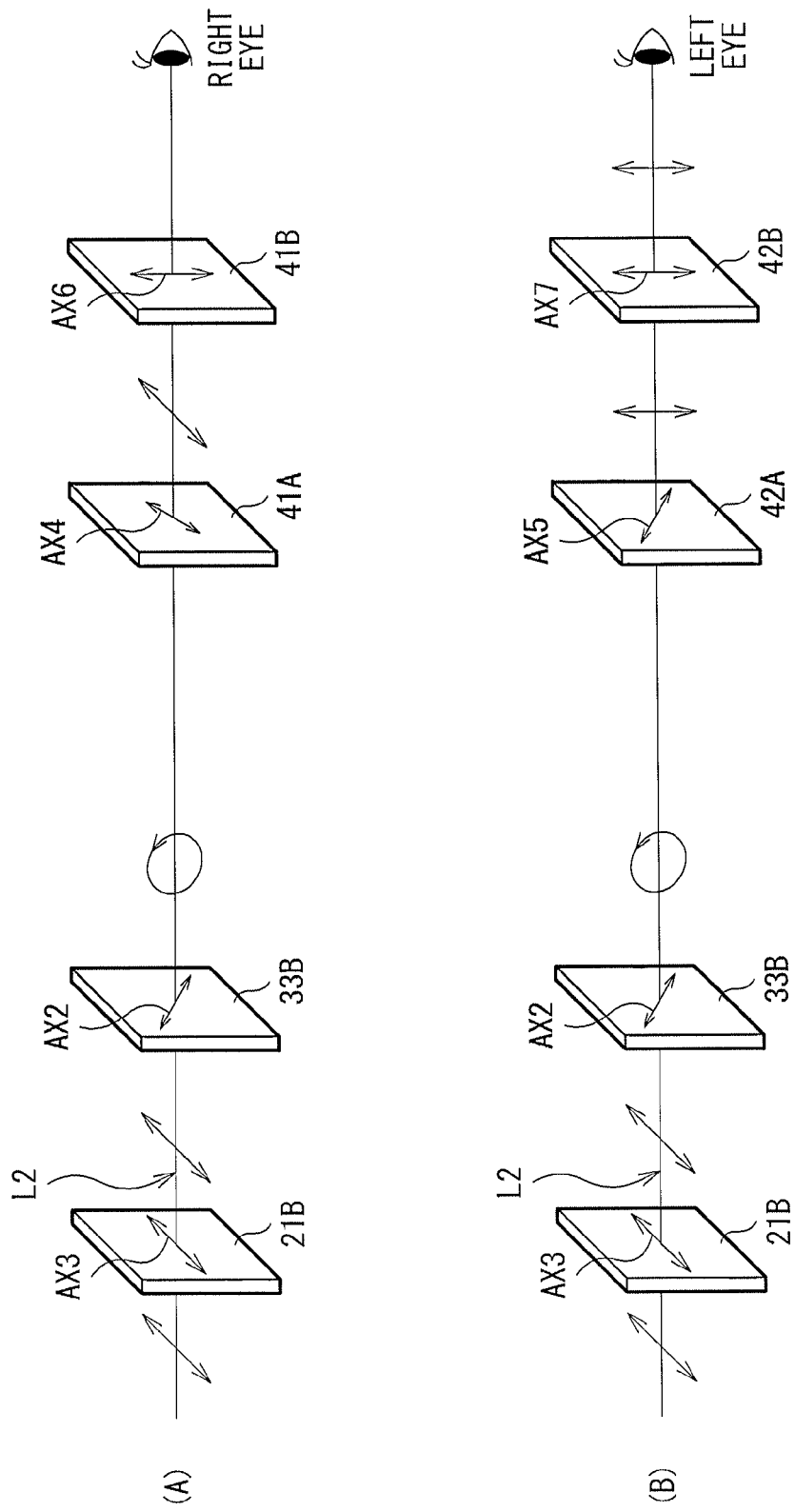
FIGS. 14A and 14B is a conceptual diagram for explaining another example of a slow axis and a transmission axis in viewing images on the display unit in FIG. 1 with a left eye.

Next, description is provided on an example of a basic operation at a time when images are displayed on the display unit 2 according to this embodiment with reference to (A) and (B) of FIG. 11 to (A) and (B) of FIG. 14.

Figure 12:
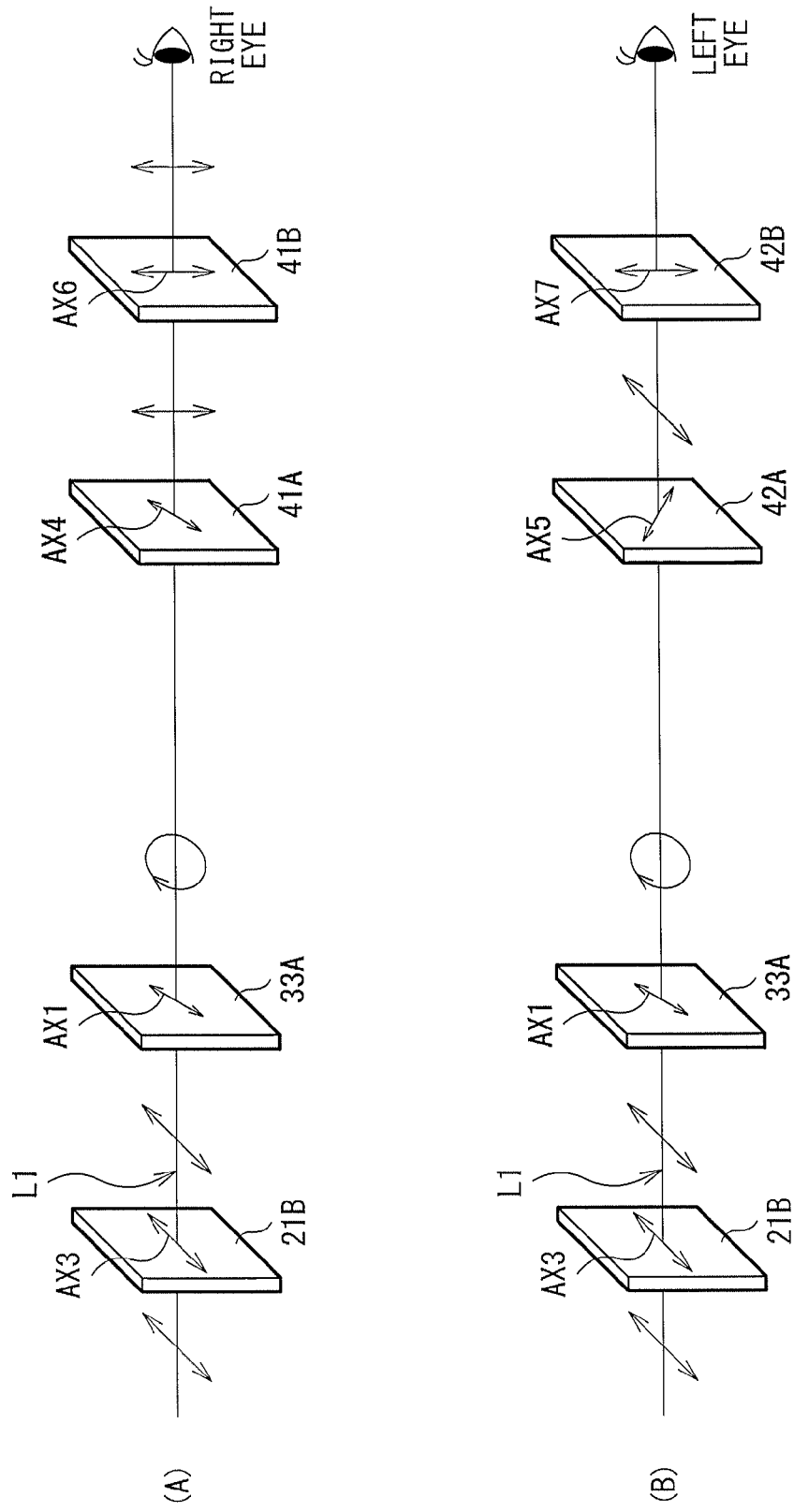
FIGS. 12A and 12B is a conceptual diagram for explaining another example of a slow axis and a transmission axis in viewing images on the display unit in FIG. 1 with a right eye.
Figure 13:
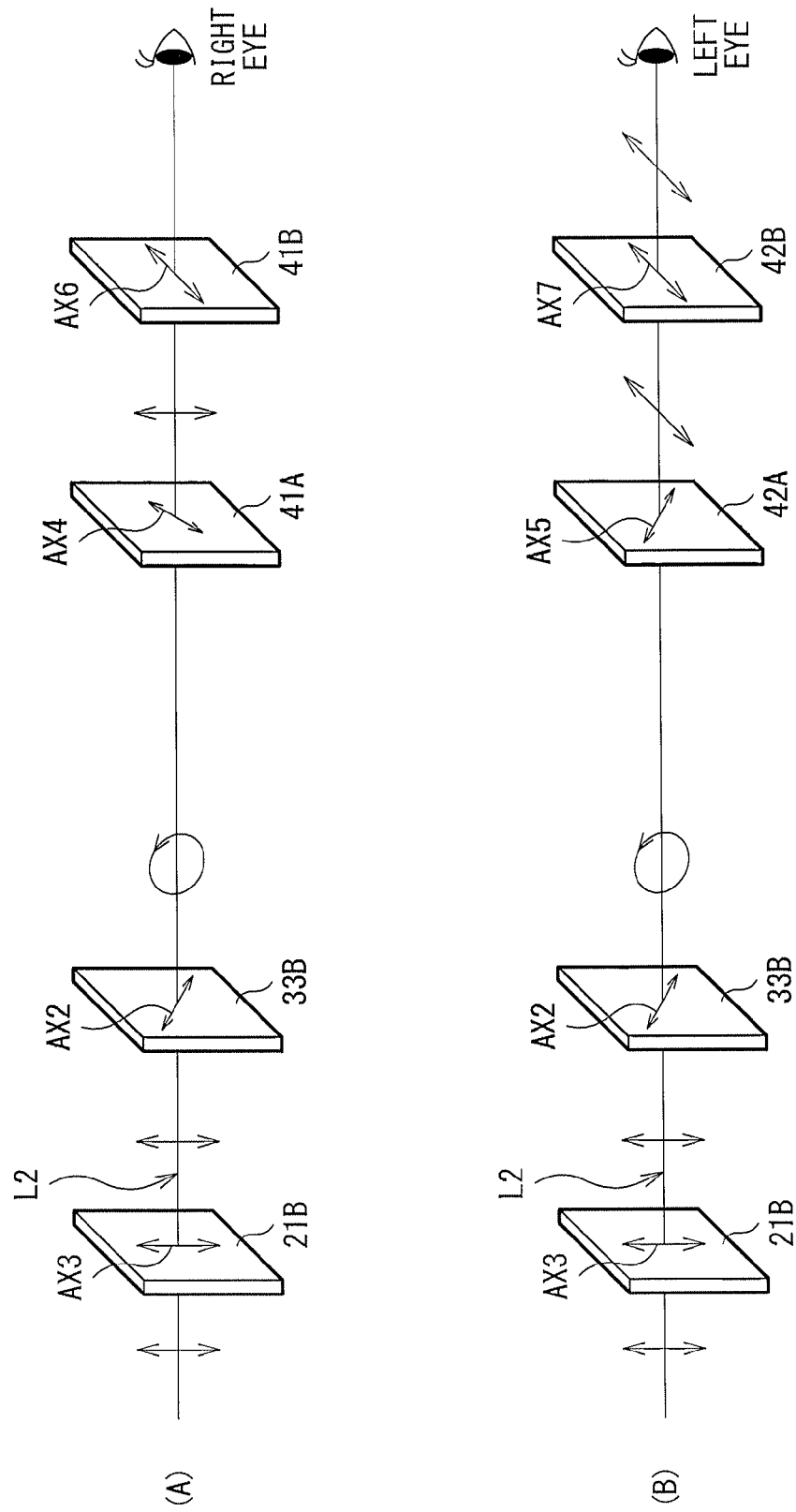
FIGS. 13A and 13B is a conceptual diagram for explaining an example of a slow axis and a transmission axis in viewing images on the display unit in FIG. 1 with a left eye.

(A) and (B) of FIG. 11 as well as (A) and (B) of FIG. 12 are each a conceptual diagram for illustrating as an example how right-eye image light L1 incoming into the right-eye phase difference region 33A of the phase difference layer 33 is perceived with left and right eyes through the polarizing glasses 2 with attention focused only on the light L1. Further, (A) and (B) of FIG. 13 as well as (A) and (B) of FIG. 14 are each a conceptual diagram for illustrating as an example how left-eye image light L2 incoming into the right-eye phase difference region 33B of the phase difference layer 33 is perceived with left and right eyes through the polarizing glasses 2 with attention focused only on the light L2. It is to be noted that the right-eye image light L1 and the left-eye image light L2 are actually output in a mixed state; however, the right-eye image light L1 and the left-eye image light L2 are illustrated separately from each other for convenience of explanation in (A) and (B) of FIG. 11 to (A) and (B) of FIG. 14.

First, a parallax signal including a right-eye image and a left-eye image as an image signal is input into the liquid crystal display panel 20 in a state where light irradiated from the backlight 10 is incident on the liquid crystal display panel 20. Accordingly, the right-eye image light L1 is output from pixels in an odd-numbered row ((A) and (B) of FIG. 11 or (A) and (B) of FIG. 12), and the left-eye image light L2 is output from pixels in an even-numbered row ((A) and (B) of FIG. 13 or (A) and (B) of FIG. 14).

Subsequently, each of the right-eye image light L1 and the left-eye image light L2 is converted into elliptically-polarized light by the right-eye phase difference region 33A and the left-eye phase difference region 33B of the phase difference layer 33, and thereafter, is output to the outside from the image display surface 1A of the display unit 1. Thereafter, the light outputted to the outside of the display unit 1 enters the polarizing glasses 2 to be converted from the elliptically-polarized light back into the linearly-polarized light by the right-eye phase difference plate 41A and the left-eye phase difference plate 42A, and then enters the polarization plates 41B and 42B.

On this occasion, a polarization axis of light corresponding to the right-eye image light L1 in light incoming into the polarization plates 41B and 42B is parallel to the polarization axis AX6 of the polarization plate 41B, and is orthogonal to the polarization axis AX7 of the polarization plate 42B. Therefore, the light corresponding to the right-eye image light L1 in the light incoming into the polarization plates 41B and 42B is transmitted only through the polarization plate 41B to reach a right eye of a viewer ((A) and (B) of FIG. 11 or (A) and (B) of FIG. 12).

On the other hand, a polarization axis of light corresponding to the left-eye image light L2 in light incoming into the polarization plates 41B and 42B is orthogonal to the polarization axis AX6 of the polarization plate 41B, and is parallel to the polarization axis AX7 of the polarization plate 42B. Therefore, the light corresponding to the left-eye image light L2 in the light incoming into the polarization plates 41B and 42B is transmitted only through the polarization plate 42B to reach a left eye of a viewer ((A) and (B) of FIG. 13 or (A) and (B) of FIG. 14).

In such a manner, the light corresponding to the right-eye image light L1 reaches the right eye of the viewer, and the light corresponding to the left-eye image light L2 reaches the left eye of the viewer. As a result, a viewer is allowed to perceive images as if stereoscopic images would be displayed on the image display surface 1A of the display unit 1.

1.5 Effects

Next, description is provided on the effects of the display unit 1 according to this embodiment. In this embodiment, in the phase difference device 30 that is bonded to the liquid crystal display panel 20, the borderline Lb between the right-eye phase difference region 33A and the left-eye phase difference region 33B has the waviness with the amplitude a that satisfies Expressions (1) to (3) above. As a result, a rate of incidence of the right-eye image light into the left-eye phase difference region 33B, or of the left-eye image light into the right-eye phase difference region 33A in reverse, that is caused by the waviness of the borderline Lb, as compared with the existing incidence rate. Consequently, this makes it possible to reduce deterioration in the crosstalk.

2. Modification Examples

Figure 15:
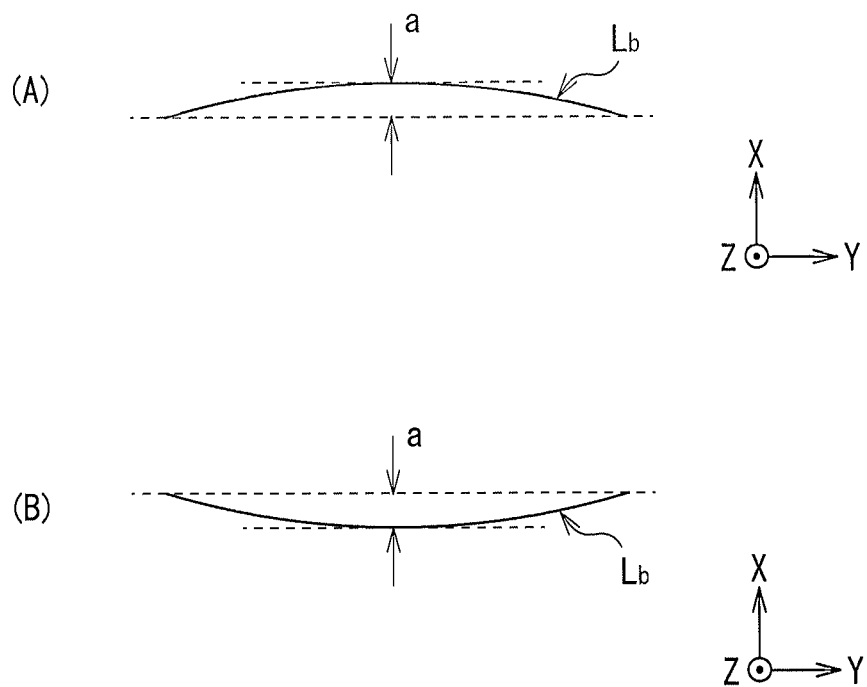
FIGS. 15A and 15B is a diagram showing a modification example of a borderline in FIG. 7.

In the above-described embodiment, a case where the borderline Lb is wavy in a regular or cyclic manner is illustrated as an example; however, for example, the borderline Lb may be wavy in an irregular manner, or may be curved at the upside or downside in a bow shape as shown in (A) and (B) of FIG. 15.

Further, in the above-described embodiment, a case where the phase difference regions (the right-eye phase difference region 33A and the left-eye phase difference region 33B) of the phase difference device 30 extend in the horizontal direction is illustrated as an example; however, the phase difference regions may extend in other direction. For example, the phase difference regions (the right-eye phase difference region 33A and the left-eye phase difference region 33B) of the phase difference device 30 may extend in the vertical direction, which is not shown in the drawing. In such a case, however, in the descriptions in the above-described embodiment, it is necessary to replace "vertical direction" with "horizontal direction" and, to replace "horizontal direction" with "vertical direction".

Moreover, in the above-described embodiment, the phase difference regions of the phase difference device 30 are limited to two kinds; however, three or more kinds of the phase difference regions may be provided.

Moreover, in the above-described embodiment, the description is provided on a case where the polarizing glasses 2 are of a circular polarization type, and the display unit 1 is a display unit for circular polarization glasses; however, the present technology may be also applicable to a case where the polarizing glasses 2 are of a linear polarization type, and the display unit 1 is a display unit for linear polarization glasses.

It is to be noted that, in the present specification, in cases where the words "equal", "same", "parallel", "orthogonal", "vertical", and "horizontal" are used, such cases include cases where those words mean substantially equal, substantially the same, substantially parallel, substantially orthogonal, substantially vertical, and substantially horizontal, respectively insofar as the effects of the present technology are not impaired. For example, some errors that are caused by various factors such as manufacturing errors and variations are allowed to be included.

Further, for example, the present technology may be configured as follows.

(A)

A display unit, including:

a display panel where a plurality of pixels are arranged in a matrix; and a phase difference device bonded to the display panel, wherein the phase difference device includes a phase difference layer where two or more kinds of phase difference regions having different slow-axis directions are arranged in correspondence with the respective pixels, each of the phase difference regions is arranged in contact with the phase difference region of a different kind, and a side section, of each of the phase difference regions, that is in contact with the phase difference region of the different kind has waviness with an amplitude a that satisfies following expressions.

$$0<a<a\max(\phi)$$

$$a\max(\phi)=-0.7/(\phi-1.2)+0.35$$

$$\phi=\arctan(P/(4d))$$

P: a pitch of the pixel d: a distance between the pixels and the phase difference device (B)

The display unit according to (A), wherein the display panel includes a light-transmissive filter section in a region, in each of the pixels, that is closer to the phase difference device, and further includes a black matrix section in a same plane as the filter section, and the phase difference region is arranged to allow a centerline of the phase difference region and a centerline of the filter section to be placed in a same plane.

(C)

The display unit according to (B), wherein a width of each of the filter sections and a distance between the filter sections that are adjacent to each other are equal to each other.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A display unit, comprising:

a display panel where a plurality of pixels are arranged in a matrix; and a phase difference device bonded to the display panel, wherein the phase difference device includes a phase difference layer where two or more kinds of phase difference regions having different slow-axis directions are arranged in correspondence with the respective pixels, each of the phase difference regions is arranged in contact with the phase difference region of a different kind, and a side section, of each of the phase difference regions, that is in contact with the phase difference region of the different kind has waviness with an amplitude a that satisfies following expressions $$0<a<a\max(\phi)$$

$$a\max(\phi)=-0.7/(\phi-1.2)+0.35$$

$$\phi=\arctan(P/(4d))$$

P: a pitch of the pixel d: a distance between the pixels and the phase difference device.

2. The display unit according to claim 1, wherein the display panel includes a light-transmissive filter section in a region, in each of the pixels, that is closer to the phase difference device, and further includes a black matrix section in a same plane as the filter section, and the phase difference region is arranged to allow a centerline of the phase difference region and a centerline of the filter section to be placed in a same plane.

3. The display unit according to claim 2, wherein a width of each of the filter sections and a distance between the filter sections that are adjacent to each other are equal to each other.

* * * * *